United States Patent [19]

Nakano et al.

[11] 3,964,460

[45] June 22, 1976

[54] HEATING OF INTAKE MIXTURE FOR AUXILIARY CHAMBER OF INTERNAL COMBUSTION ENGINE

[75] Inventors: Soichi Nakano, Kawagoe; Yoshitoku Iizuka, Toda; Masao Watanabe, Niiza, all of Japan

[73] Assignee: Honda Giken Kogyo Kabushiki Kaisha, Tokyo, Japan

[22] Filed: Nov. 19, 1973

[21] Appl. No.: 417,261

[30] Foreign Application Priority Data
Dec. 4, 1972  Japan..........................47-120680

[52] U.S. Cl........................... 123/191 S; 123/75 B; 123/32 ST; 123/DIG. 4; 123/122 AB; 123/122 R
[51] Int. Cl.²......................................... F02B 19/10
[58] Field of Search............. 123/75 B, DIG. 4, 127, 123/32 ST, 122 A, 122 AA, 122 R, 191 S, 32 C, 32 SP, 32 SA; 165/52

[56] References Cited
UNITED STATES PATENTS

| | | | |
|---|---|---|---|
| 1,305,170 | 5/1919 | Ross...................................... | 165/52 |
| 1,323,378 | 12/1919 | Richard et al. ....................... | 165/52 |
| 1,354,484 | 10/1920 | Hoyt............................ | 123/122 AA |
| 1,417,804 | 5/1922 | Davies .................................. | 165/52 |
| 1,846,008 | 2/1932 | Weber............................ | 123/122 A |
| 1,925,032 | 8/1933 | Dunner............................. | 165/52 X |
| 2,836,161 | 5/1958 | Primakoff....................... | 123/122 A |
| 3,092,088 | 6/1963 | Goossak et al................. | 123/32 ST |
| 3,543,736 | 12/1970 | Suzuki et al..................... | 123/32 ST |
| 3,659,564 | 2/1972 | Suzuki et al. .................... | 123/127 X |

*Primary Examiner*—Charles J. Myhre
*Assistant Examiner*—William C. Anderson
*Attorney, Agent, or Firm*—Lyon & Lyon

[57] ABSTRACT

An internal combustion piston engine has one or more cylinders each having a main combustion chamber and an auxiliary combustion chamber connected by a torch nozzle. Exhaust gases from the main chamber are used to heat the intake mixture for the auxiliary combustion chamber. Contiguous thin wall pipes, one carrying hot exhaust gases and one carrying a rich mixture for the auxiliary chamber, are both enclosed within a thick wall outer housing. A riser for the auxiliary intake pipe is also enclosed within said housing. The thin wall exhaust pipes join an exhaust chamber secured to the thick wall housing at a central location to minimize deformations caused by thermal expansion.

3 Claims, 3 Drawing Figures

HEATING OF INTAKE MIXTURE FOR AUXILIARY CHAMBER OF INTERNAL COMBUSTION ENGINE

This invention relates to internal combustion piston engines of the type wherein each cylinder has a main combustion chamber and an auxiliary combustion chamber, connected by a torch nozzle. Rich mixture supplied to the auxiliary combustion chamber is ignited by a spark plug and this causes a jet flame to project through the torch nozzle to ignite a lean mixture in the main combustion chamber.

It is important to heat the rich mixture to promote atomization and to prevent condensation of fuel droplets, which would have an adverse effect on the performance of the engine and would tend to produce unwanted emissions in the exhaust gases discharged into the atmosphere. In accordance with this invention, each cylinder is provided with a thin wall intake pipe to carry the rich mixture for the auxiliary combustion chamber. Each such intake pipe is mounted in contiguous relationship with a thin wall pipe carrying hot exhaust gases from the main combustion chamber, both thin wall pipes being enclosed within a thick wall housing. The riser for the auxiliary intake pipe is also enclosed within the housing. In order to minimize deformation caused by thermal expansion, the thin wall exhaust pipe and the exhaust chamber secured thereto are supported at a central location on the thick wall housing.

Other and more detailed objects and advantages will appear hereinafter.

Figure 1:
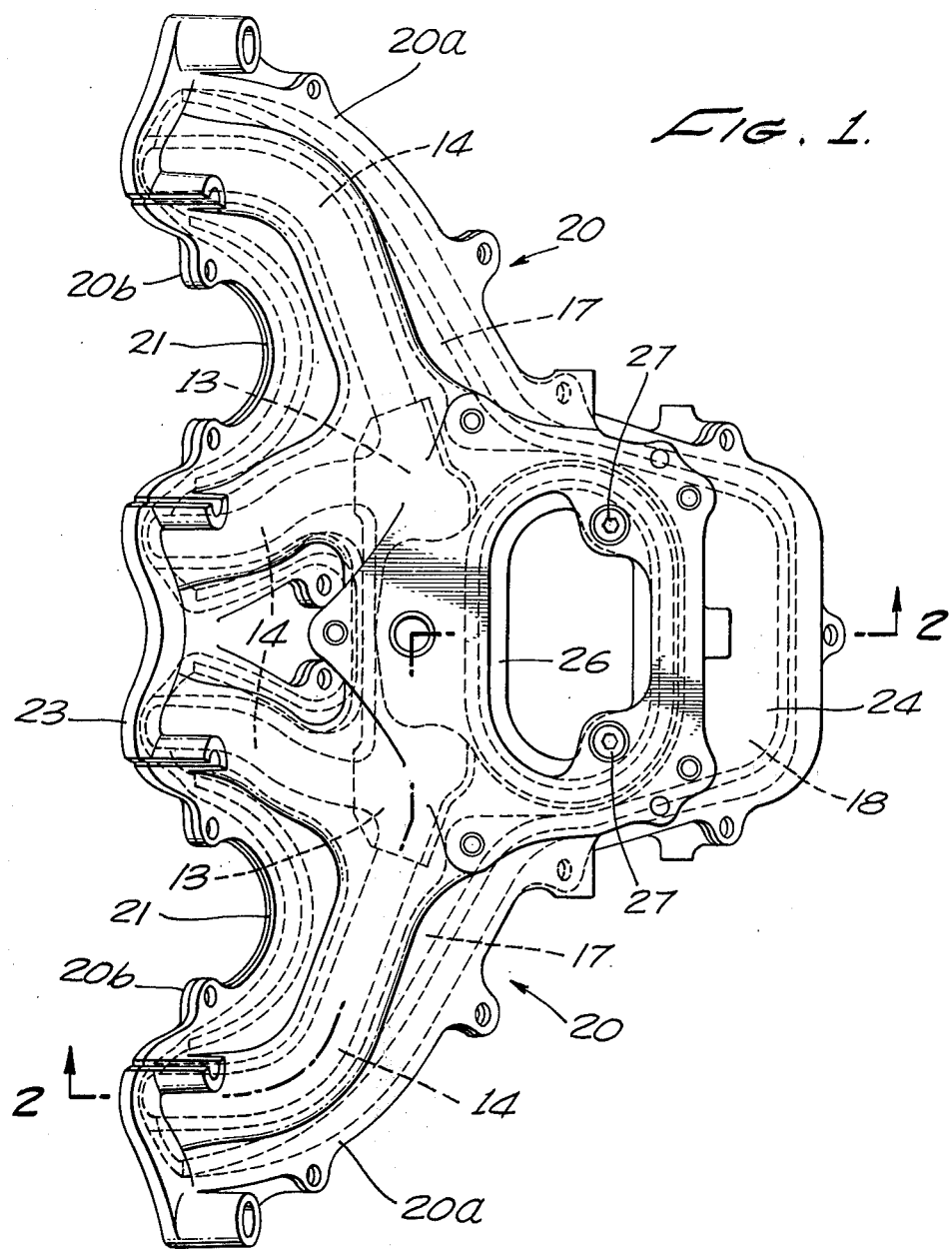
FIG. 1 is a plan view showing a preferred embodiment of the invention.
Figure 3:
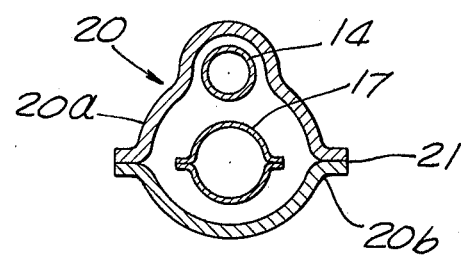
FIG. 3 is a transverse sectional detail taken substantially on the lines 3—3 as shown in FIG. 2.
Figure 2:
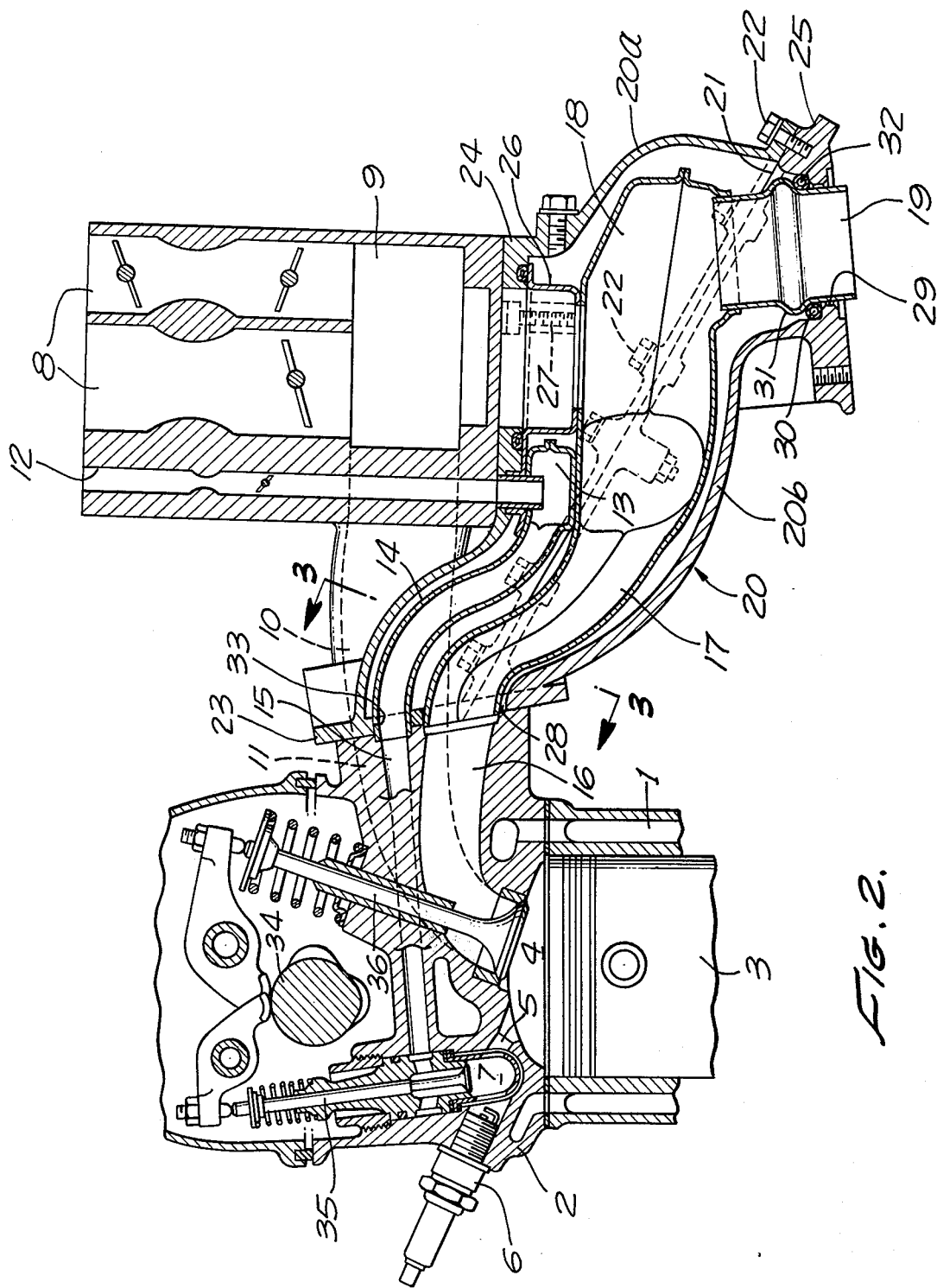
FIG. 2 is a sectional side elevation taken substantially on the lines 2—2 as shown in FIG. 1.

Referring to the drawings, the cylinder block 1 supports and is connected to the cylinder head 2. The piston 3 forms one wall of the main combustion chamber 4. An auxiliary combustion chamber 7 is connected through a torch nozzle restriction 5 to the main combustion chamber 4. A spark plug 6 has electrodes positioned to ignite the combustible mixture in the auxiliary chamber. A main carburetor having two barrels 8 supplies a lean mixture to the main combustion chamber 4 through a main riser 9 and main intake pipes 10. Each of the main intake pipes 10 is connected to a main intake passage 11 leading to a main combustion chamber 4 through a main intake valve, not shown. Rich mixture is supplied to the auxiliary combustion chamber 7 from the auxiliary carburetor 12 through the auxiliary riser 13 and auxiliary intake pipes 14. The pipes 14 are connected to the auxiliary intake passages 15 in the engine head 2. Rich mixture in each auxiliary combustion chamber 7 is ignited by the spark plug 6, and the flame produced thereby is projected through the torch nozzle restriction 5 into the main combustion chamber to ignite the lean mixture therein.

The main riser 9 has branches which connect to each of the main intake pipes 10. Similarly, the auxiliary riser 13 has branches which connect to the auxiliary intake pipes 14. The engine head 2 has exhaust passageways 16 each connected to one of the main combustion chambers 4, respectively. The exhaust valve 36 which controls flow through the exhaust passage 16, as well as the main intake valve, not shown, and the auxiliary intake valve 35 are operated by conventional cam means 34.

In accordance with this invention, each auxiliary intake pipe 14 and its corresponding exhaust pipe 17 are formed as two contiguous thin walled metal pipes. The pipes are positioned within a thick wall outer housing 20. Thus, the exhaust pipes 17 are heated by exhaust gas flowing therethrough to raise the temperature within the outer housing 20, and the auxiliary intake pipes 14, contiguous to the pipes 17, respectively, are heated from the outside to warm up the rich mixture flowing therethrough, effectively preventing fuel condensation from taking place in the rich mixture.

The housing 20 may be constructed of cast iron or cast steel, for example, and comprises upper and lower mating halves 20a and 20b fastened together along line 21 with suitable threaded fastenings 22. The housing 20 encloses not only the pipes 14 and 17, but also encloses the auxiliary riser 13 at the end of the auxiliary intake pipes 14, so that the rich mixture is heated within the riser 13. The housing 20 also envelops the liner 18 at the end of the exhaust pipes 17, as well as the common exhaust pipe 19 extending from the liner 18. In this way heat from exhaust gas heats the interior of the housing 20 at each of the parts 17, 18 and 19.

The housing 20 is secured at one end to the cylinder head 2 by means of a flange connection 23. It is also attached to the main carburetor 8, 8 and auxiliary carburetor 12 by a flange 24. It has a third flange 25 at its lower end for connection to an exhaust pipe system, not shown. The exhaust pipes 17, liner 18 and common exhaust pipe 19 are supported in the housing 20 in the following manner: the liner 18 is attached to the flange 24 by a bracket 26 and an insulated threaded connection 27, so that the liner 18 is suspended from the flange 24. The exhaust pipes 17 extending from the liner 18 are floatingly supported by fitting the inlet ends thereof into recesses 28 provided in the flange 23. The flange 24 has a central opening and the bracket 26 and liner 18 each have openings aligned with it. The common exhaust pipe 19 extending from the other end of the liner 18 extends through opening 29 in the flange 25 so as to allow it to slide freely. An elastic seat 32 is mounted in a recess 30, and an annular enlargement on the exhaust pipe 19 rests on this elastic seat 32. Thus, when heated to a relatively high temperature, the exhaust pipes 17, liner 18 and common exhaust pipe 19 can expand longitudinally within the housing 20. In this way they are effectively protected against damage due to thermal expansion.

The auxiliary intake pipes 14 are secured between the flange 24 and the liner 18 near the auxiliary riser 13. The intake pipes 14 are fitted and secured by welding or other means into openings 33 provided in the housing flange 23, so that there can be no rich mixture leakage past the joint. However, pipes 14 are relatively small in diameter so that thermal expansion may be absorbed by bending and without damage.

Having fully described our invention, it is to be understood that we are not to be limited to the details herein set forth but that our invention is of the full scope of the appended claims.

We claim:

1. In a multi-cylinder internal combustion engine in which each cylinder has a main combustion chamber and an auxiliary combustion chamber connected by a torch nozzle, and having a first passage for supplying a rich mixture to the auxiliary chamber and a second passage for conveying hot exhaust gases from the main combustion chamber, the improvement comprising, in combination: a plurality of thin wall intake pipes each connected to one of the first passages, respectively, a plurality of thin wall exhaust pipes each connected to one of the second passages, respectively, pairs of intake and exhaust pipes being curved and contiguous, a thick wall housing having portions enclosing each pair of said pipes, each of said intake pipes being integrally connected to a common auxiliary riser enclosed within said housing, and each of said exhaust pipes being integrally connected to a common exhaust chamber enclosed within said housing, the exhaust chamber having an exit pipe projecting through said housing, said housing having a flange provided with a central opening, and means including a bracket spacing the exhaust chamber from the flange, the chamber and the bracket having openings aligned with the central opening in flange.

2. The combination set forth in claim 1 in which each exhaust pipe has a sliding connection with its respective second passage, the exit pipe having a sliding connection with said housing, and means for securing said exhaust chamber at a central location to said housing to minimize deformations caused by thermal expansion.

3. The combination set forth in claim 1 in which the thick wall housing is of split construction comprising upper and lower sections joined together, said flange being provided in the upper section, and the exit pipe being positioned in the lower section.

* * * * *